United States Patent [19]

Geen et al.

[11] 4,124,691
[45] Nov. 7, 1978

[54] METHOD FOR THE PREPARATION OF RETICULATE CARBON STRUCTURES

[75] Inventors: Henry C. Geen, Brooklyn; Clarence S. Vinton; Christopher J. Torbet, both of Ann Arbor, all of Mich.

[73] Assignee: Chemotronics International, Inc., Ann Arbor, Mich.

[21] Appl. No.: 782,624

[22] Filed: Mar. 30, 1977

[51] Int. Cl.$^2$ .............................................. C01B 31/02
[52] U.S. Cl. .................................. 423/449; 264/29.1; 264/80; 423/445; 521/52
[58] Field of Search ....................... 423/449, 445, 448; 264/29.1, 80; 260/2.5 R, 2.5 BD, 2.5 D, 2.5 M

[56] References Cited

U.S. PATENT DOCUMENTS

| | | | |
|---|---|---|---|
| 3,121,050 | 2/1964 | Ford | 423/448 |
| 3,175,025 | 3/1965 | Geen et al. | 264/80 |
| 3,342,555 | 9/1967 | McMillan | 423/449 |
| 3,345,440 | 10/1967 | Googin et al. | 264/29.1 |
| 3,387,940 | 6/1968 | McHenry et al. | 423/449 X |
| 3,446,593 | 5/1969 | Moutaud et al. | 423/449 X |
| 3,574,548 | 4/1971 | Sands et al. | 423/449 |
| 3,857,913 | 12/1974 | Crow et al. | 423/449 X |
| 3,922,334 | 11/1975 | Marek | 423/445 |
| 3,927,186 | 12/1975 | Vinton et al. | 423/449 X |
| 4,022,875 | 5/1977 | Vinton et al. | 423/445 X |

Primary Examiner—Edward J. Meros
Attorney, Agent, or Firm—Ian C. McLeod

[57] ABSTRACT

A method for preparing reticulate thermoset resin structures is described. Thermoset or thermosettable resin containing foams, prepared by a method wherein thin membranes dividing contiguous cells in a thin membraned, thick stranded thermoset or thermosettable resin foam with interconnected cells are produced, and are thermally reticulated. The foams are preferably thermally reticulated by providing a combustible gas mixture inside the cells of the foam and then igniting the mixture to destroy the foam membranes. The thermosettable or thermoset reticulate resin structures so produced are particularly useful for preparing carbon structures with the same geometry by heating at elevated temperatures under reducing, inert or vacuum conditions.

12 Claims, 12 Drawing Figures

METHOD FOR THE PREPARATION OF RETICULATE CARBON STRUCTURES

BACKGROUND OF THE INVENTION

The present invention relates to a method for preparing novel thermoset or thermosettable reticulate resin structures. It particularly relates to reticulate carbon structures derived from the resin structures.

U.S. Pat. No. 3,927,186 to Vinton and Franklin shows a method for producing reticulate carbon structures by rapid firing of reticulate polyurethane structures which have been infused with a liquid furan resin or resin precursor. U.S. Pat. No. 3,922,334 to Marek shows phenolic resin containing structures prepared by infusion of a reticulate polyurethane structure with a thermosettable phenolic resin dissolved in tetrahydrofuran as a solvent and then carbonization for a longer period. These methods work very well but after the infusion step considerable care is required to remove unalloyed or non-infused resin from the surfaces of the polyurethene reticulate structure. The liquid thermosettable resins or resin precursors require an infusion step followed by an excess removal step, both entailing handling operations. It would be preferred if the thermoset resin structures could be produced directly by foaming and then reticulated so that the infusion and excess removal steps could be avoided.

The use of a combustible gas mixture to reticulate polyurethane foams, particularly flexible foams as well as other cellular materials, is described in U.S. Pat. No. 3,175,025. The method is used commercially worldwide for reticulating flexible polyurethane foams by destroying the cell membranes; however, it has not been commercially used for other types of foams. The polyurethane foams have a specific foam structure with thin relatively uniform cross-sectioned cell membranes attached to much thicker strands defining the cells and also defining the intersection of membranes which are most susceptible to thermal reticulation. The cell membranes join the strands with a relatively very small radius of curvature between them. As a result the heat from the combustion, even though transient, destroys the membranes. On the other hand, thermoset resins usually do not form polyurethane-like foams, but rather the cells tend to be spherical with relatively irregularly cross-sectioned, usually closed cellular partitions between the cells. There is a relatively poor or non-existent definition between strands and membranes in the cells. The thermoset resin foams of U.S. Pat. No. 3,121,050 to Ford are generally believed to be of this type.

The prior art thermoset resin foams have the advantage of being converted to carbon rather than being volatilized during heating. Polyurethane foams which are flexible volatilize virtually completely when heated above about 400° C. and do not carbonize. Rigid polyurethane foams which are more cross-linked will carbonize, as shown by U.S. Pat. No. 3,302,999 to Mitchell, and are essentially closed cell (unicellular) foams.

U.S. Pat. Nos. 3,345,440 to Googin et al.; 3,574,548 to Sands et al.; 3,635,676 to Sands et al.; 3,857,913 to Crow et al.; and 3,975,318 to Larsen et al. show unreticulated thermoset resin membrane-containing foams some of which are described as being carbonized over relatively long periods of time and wherein the carbon product contains essentially all of the membranes present in the uncarbonized foam. It would be desirable to be able to reduce the carbonization period and preferably at the same time produce reticulated carbon structures without having to infuse a polyurethane reticulate structure as in U.S. Pat. No. 3,972,186 to Vinton et al.

OBJECTS

It is therefore an object of the present invention to provide rapidly carbonizable reticulate thermoset or thermosettable resin structures. It is particularly an object of the present invention to provide a method for thermally reticulating thermosettable or thermoset resin foams which have a cell structure like a flexible polyurethane foam. Further, it is an object of the present invention to provide a preferred method which eliminates the need for infusion of a reticulate polyurethane structure with a liquid thermosettable resin or resin precursor. These and other objects will become increasingly apparent by reference to the following description and to the drawing.

IN THE DRAWING

Figure 3:
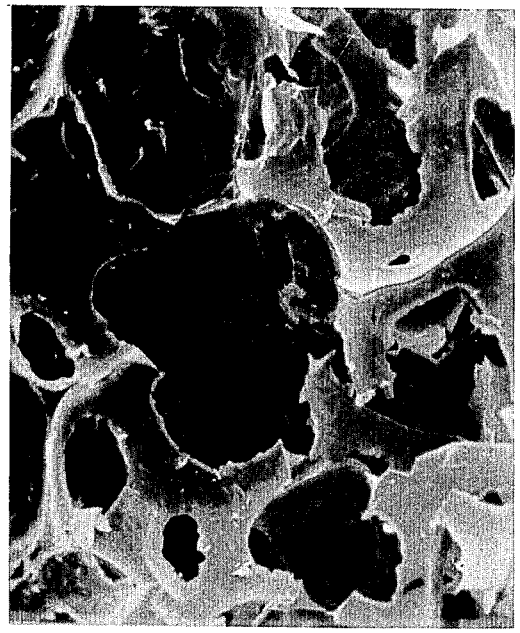
FIGS. 3 and 5 are 100 times scanning electron micrographs of a thin cross-section of thermally reticulated thermoset resin structures prior to the carbonization, prepared by a process where the foam has been infused as shown in FIG. 2.
Figure 4:
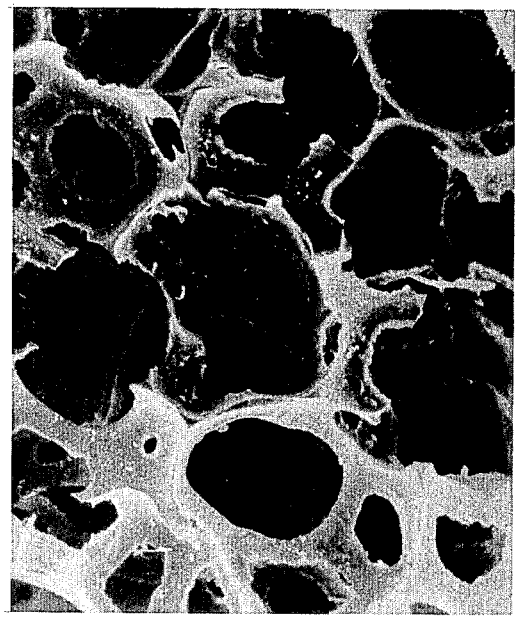
Figure 5:
Figure 6:
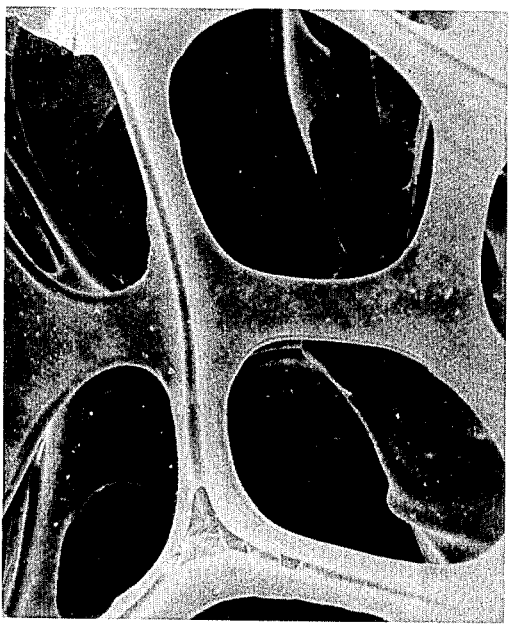

FIGS. 4 and 6 are 100 times scanning electron micrographs of a thin cross-section of the carbonized reticulate thermoset resin structures of FIGS. 3 and 5, respectively.

Figure 7:
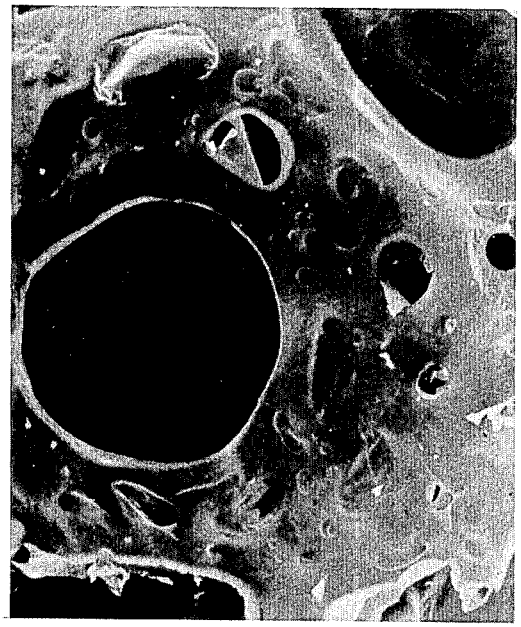
Figure 10:

FIGS. 7 and 10 are 100 times scanning electron micrographs of a thin cross-section of foamed thermoset resins having polyurethane foam-like membranes, prior to reticulation by the process of the present invention.

Figure 8:
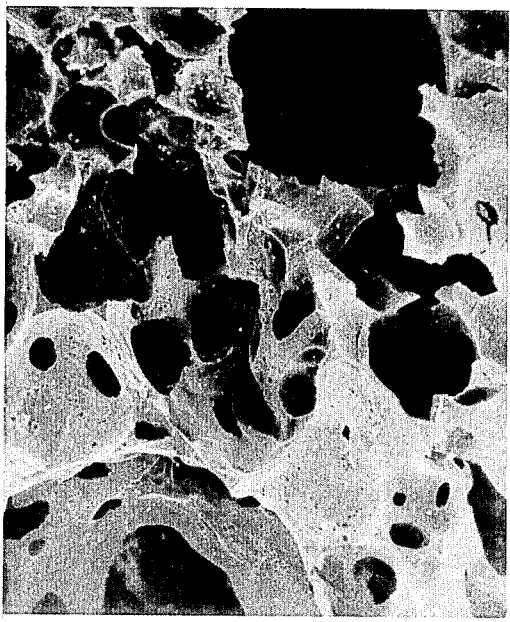
Figure 11:
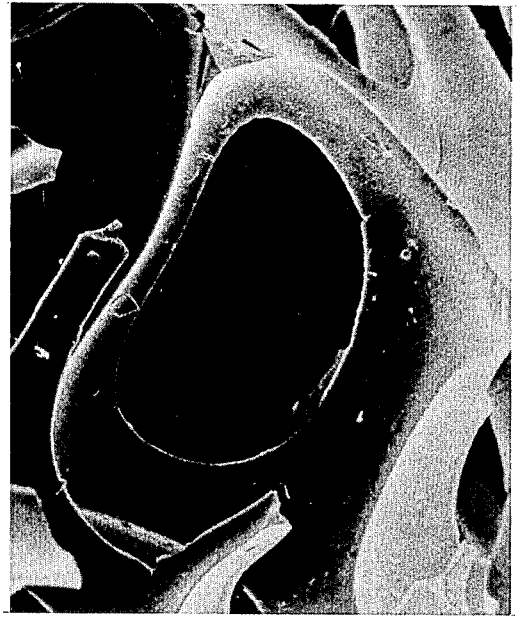

FIGS. 8 and 11 are 100 times scanning electron micrographs of a thin cross-section of the thermally reticulated thermoset resin structures of FIGS. 7 and 10, respectively, prior to carbonization.

Figure 9:
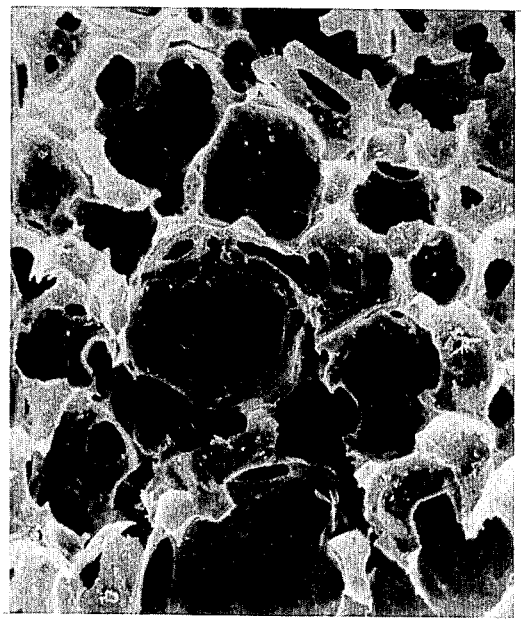
Figure 12:
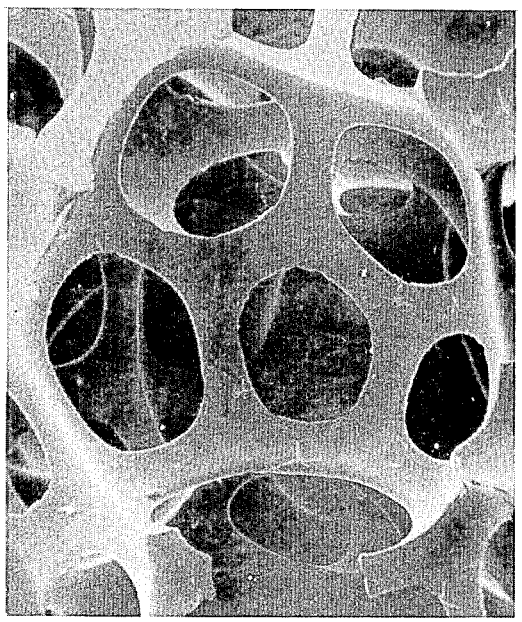

FIGS. 9 and 12 are 100 times scanning electron micrographs of the carbonized reticulated resin structures of FIGS. 8 and 11, respectively.

DESCRIPTION OF THE INVENTION

The present invention relates to the process for producing a reticulate structure of interconnected strands which comprises: providing a thermoset or thermosettable resin containing foam formed with interconnected cells with membranes attached to the strands dividing contiguous cells and which is carbonizable to a reticulate carbon structure; and thermally destroying the membranes in the resin foam to form a reticulate resin structure. Preferably the thermal destruction of the membranes is accomplished by igniting a combustible gas mixture provided in the cells of the foam so as to destroy the membranes and thus thermally reticulate the foam.

The process of the present invention uses a thermoset or thermosettable resin foam (including membranes joined to strands forming cells) as a starting material and converts the foam into a non-foam product, herein referred to as a "reticulated structure." A foam is cellular since by definition the word "cell" means an enclosure having walls. In foams where the membranes, which are the walls forming the cell, are removed leaving only strands, there is no longer an enclosure and only the very open reticulate structure remains which therefore is not a foam or cellular structure. The distinction is used herein.

An important feature of the present invention is that the cells of the thermoset or thermosettable resin foam must have a geometry which allows them to be thermally reticulated. The cells must be interconnected to allow the combustible gas for thermal reticulation to fill the cells and surround the membranes. The foam must have the usual flexible polyurethane type cell structure with reasonably uniformly thin cross-sectioned membranes attached to relatively very thick strands and with openings in at least some of the membranes to cause interconnections between the cells (so called "open cell" foam). Whether the thermosettable resin is foamed or it is infused into an unreticulated foam structure, the cell membranes must be substantially thinner in cross-section that the much thicker strands which define the intersections of the membranes. Because of this fact the process of forming the unreticulated thermosettable or thermoset foam is important to achieve satisfactory thermal reticulation and must produce a product with a geometry comparable to flexible polyurethane foam.

Preferably the thermoset or thermosettable resin foam which can be reticulated is prepared by direct foaming, although infusing an unreticulated polyurethane foam in the manner of pending application Ser. No. 634,615, filed Nov. 24, 1975, now U.S. Pat. No. 4,022,875, using a liquid furan resin or furan resin precursor or in the manner of U.S. Pat. No. 3,922,334 to Marek using a phenolic resin in a solvent can be used. If infusion is used, care must be taken to remove excess thermosettable resin from the surfaces of the polyurethane foam to achieve rapid carbonization. The thermosettable resins are directly foamed with a polyisocyanate and water or in conjunction with a long chain polyester or polyurethane forming polyhydroxyl compound. The foams which eliminate the conventional polyester or polyester polyol and use a polyisocyanate reacted directly with a liquid thermosettable resin or its precursor are particularly unique in that they have the desired geometry for thermal reticulation and yet eliminate the conventional polyurethane component which in any event is usually vaporized and not carbonized during heating to carbonization temperatures. Considerable economy is achieved in producing such foams which can be thermally reticulated and are also directly carbonizable to unreticulated or reticulated carbon structures.

As indicated previously, thermal reticulation with heated gases is described in U.S. Pat. No. 3,175,025 to Geen et al. Unexpectedly it has been found that the method can be applied to selected thermoset or thermosettable resin foams to produce reticulate structures which are rapidly carbonizable to reticulate carbon structures. As used herein, the phrase "rapidly carbonizable" means in less than about 5 hours from the time the carbonization of the sample begins (usually about 400° C. to 500° C.). This carbonization period is in contrast to the prior art methods, particularly with unreticulated thermoset resin foams, which require many hours of very slow heating to achieve carbonization without causing self-destruction.

Generally the combustible gas is a mixture of an oxidizable gas and an oxidizer gas. Natural gas or hydrogen are the preferred oxidizable gases because of their availability; however, many other oxidizable gases are suitable. In particular, lower alkanes, containing 1 to 10 carbon atoms, individually or in mixture, can be used and these are the preferred oxidizable gases. Other oxidizable gases which can be used are for instance: ammonia, hydrazine, hydrogen sulfide and various hydrocarbons particularly lower alkenes and alkynes such as acetylene and ethylene. It will be appreciated that liquid oxidizable materials can be used simply by heating them to the gaseous state before introduction into a chamber or by heating after introduction into the chamber or by introducing them at pressures sufficiently low to cause them to volatilize at the ambient chamber temperatures. Suitable oxidizer gases are for instance, oxygen or ozone and halogens such as chlorine. It will be appreciated however, that oxygen is preferred. Further, it is preferred to use oxidizer materials which are gaseous at room temperatures particularly oxygen or oxygen enriched air or pressurized air.

Various sealed chambers can be used for the gaseous combustion as described in U.S. Pat. No. 3,175,025 as is known to those skilled in the art. Preferably the chamber is a closed rigid chamber. The process of the present invention is used to reticulate such thermoset or thermosettable resin foamed materials even though they have widely varying cell sizes. It was found that the energy produced upon combustion was easily regulated by adjusting the pressure of the gaseous mixture in the chamber. It was further found that the energy produced upon combustion could be easily reduced by the use of non-reactive gaseous diluents, such as nitrogen. The process of the present invention can be used to reticulate the structures while the thermoset resin foam is uncured or when it is cured.

Carbonization of the thermosettable or thermoset resin reticulate structures is achieved at temperatures in excess of about 400° C. under neutral, reducing or vacuum conditions as described in detail by the prior art for carbonization in general. A vitreous reticulate carbon structure is preferred which starts to form at temperatures above about 500° C.

SPECIFIC DESCRIPTION

Examples I, II and VII show the thermal reticulation of thermosettable or thermoset resin infused foams. Examples III to VI show the reticulation of directly foamed thermosettable or thermoset resins. As will be seen from the Examples, there are many variations of the method of the present invention.

EXAMPLE I

Figure 1:
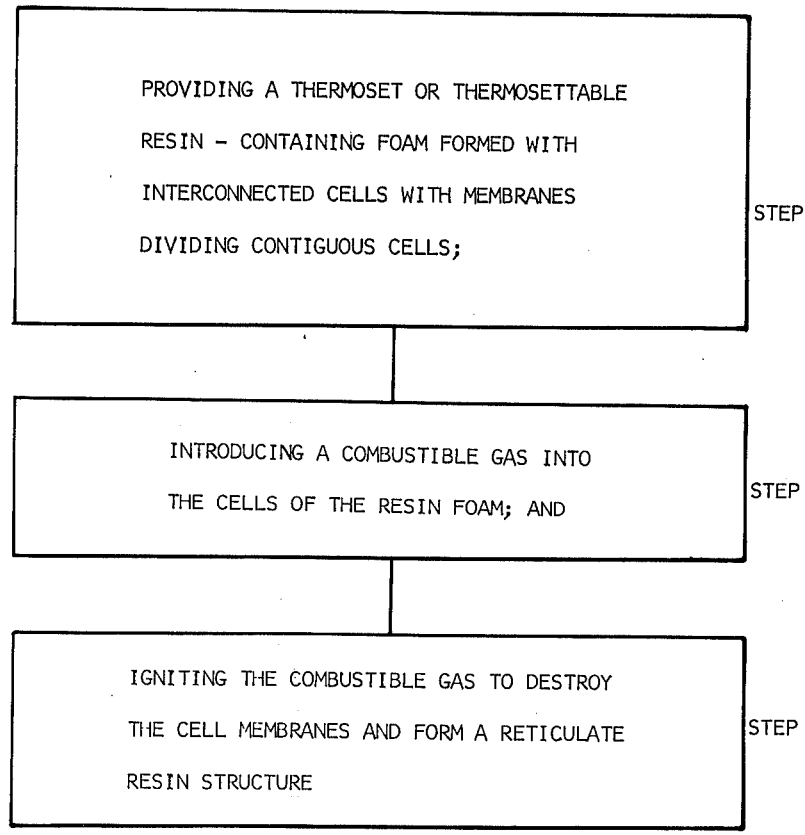
FIG. 1 is a schematic view illustrating the steps of the method of the present invention.
Figure 2:
FIG. 2 is a 100 times scanning electron micrograph of a thin cross-section of a thermoset resin foam prepared by a process where the foam is infused prior to reticulation by the process of the present invention with a liquid thermoset resin or resin precursor without excess infusing material remaining on the foam surfaces.

A sample of an unreticulated polyester polyurethane foam having a bulk density of about 0.029 gms/cc and about 40 pores per cm was infused with furfuryl alcohol catalyzed with 1% of methyl paratoluene sulfonate by weight for 10 minutes and excess solution was then removed by squeezing against a screen. The furfuryl alcohol was cured to a furan resin in the foam by heating in an oven at 150° C. for 5 hours. The infused and cured sample had polyurethane-like foam membranes as shown in FIG. 2.

The sample was then placed in an enclosed sealed rigid chamber in the manner of U.S. Pat. No. 3,175,025.

A vacuum pump was then used to evacuate the air from the chamber. The chamber was then pressurized to 15 psig (2.02 atmospheres) with a 3 to 1 by volume mixture of hydrogen and oxygen, which is a reducing atmosphere, and then ignited. The combustion of the gas removed the cell membranes, leaving the strands intact to form a reticulate structure as shown in FIG. 3.

The sample was then placed in a retort at room temperature and heated to 1000° C. and carbonized over a period of 4 hours in a reducing atmosphere, after which it was held at 1000° C. for 1 hour. The rate of heating was about 250° C. per hour. Upon removal from the furnace, the reticulated carbon product was found to be about the same volume as the original non-infused (unreticulated) foam bulk volume, as shown in FIG. 4.

EXAMPLE II

The polyurethane foam of Example I was infused with furfuryl alcohol mixed with 1% by weight methyl paratoluene sulfonate as the catalyst and looked like the product of FIG. 2. The uncured, infused samples were reticulated as in Example I with a 20, 30, 40 psig (2.4; 3.0 and 3.7 atmospheres, respectively) mixture of 3:1 by volume hydrogen and oxygen. The 20 psig sample was not satisfactorily reticulated, but the other two samples were reticulated, as shown in FIG. 5. The reticulated samples were then cured and then placed in a furnace with a reducing atmosphere and heated, as in Example I.

The carbon product, reticulated at 30 psig, had a bulk density of 0.063 g/cc and a crushing strength of 26 psi (1.8 kilograms per square centimeter). The sample reticulated at 40 psig had a bulk density of 0.076 gm/cc and a crushing strength of 31 psi (2.2 kilograms per square centimeter), as shown in FIG. 6. An unreticulated carbon foam comparative control had a bulk density of 0.088 gm/cc and a crushing strength of 23 psi (1.6 kilograms per square centimeter).

EXAMPLE III

A block of foam was made by mixing in the following order:
100 gms of Hypol TM FHP 3000 made by W. R. Grace Co. (a polyurethane prepolymer having the following characteristics):
Equivalent weight/NCO group of 400 to 450
Density at 25° C. of 1.15 g/ml
Viscosity in cps at 25° C. of 15,000 to 20,000
NCO content meq/g of 2.2 to 2.5
100 gms of Durez TM 14383 furfuryl alcohol resin prepolymer (which had been on the shelf at room temperature for about 5 years and thus was very viscous)
100 gms of water with 2% by weight paratoluene sulfonic acid catalyst; and
4 drops of 1034 silicone surfactant made by General Electric Co.

The resultant foam was then set aside for a day to partially cure and then totally cured at 150° C. for 5 hours, as shown in FIG. 7.

A sample was cut from the block of foam and reticulated at 15 psig (2.02 atmospheres) with a 3:1 by volume mixture of hydrogen and oxygen, as shown in FIG. 8.

The reticulated structure was then carbonized in a reducing atmosphere in a furnace as in Example I, as shown in FIG. 9. The final bulk density of the carbon structure was 0.131 gm/cc and the maximum crushing strength was about 160 psi (11.3 kg/sq cm.). For comparative purposes the parent (unreticulated) foam from the same block was fired at 1000° C. to carbonize it. Its maximum crushing strength was 130 psi (9.2 kg/sq cm) and it had a bulk density of 0.129 gm/cc.

EXAMPLE IV

A foam sample was made by mixing: 40 gms of Durez TM 14383 resin prepolymer as used in Example III; 20 gms toluene diisocyanate; and 1 gm of a 50/50 by weight ethanol and paratoluene sulfonic acid mixture as the catalyst. No conventional polyurethane resin polyol was used.

Using the procedure of Example III, the foam was reticulated at 1 atmosphere with a 3:1 by volume hydrogen and oxygen mixture, then cured at 150° C. for 5 hours and then carbonized at 1000° C. as in Example I. The final carbon product bulk density was 0.026 gm/cc and the crushing strength was about 2 psi (0.14 kg/sq cm). The corresponding unreticulated carbon foam had a bulk density of 0.025 gm/cc and a maximum crushing strength of about 1 psi (0.07 kg/sq cm).

EXAMPLE V

A sample was made by mixing:
30 gms of Durez TM 14383 resin as used in Example III
15 gm toluene diisocyanate; and
1 gm of a 50/50 by weight ethanol and paratoluene sulfonic acid mixture.

The sample was cured at 150° C. for 5 hours to a rigid foam, as shown in FIG. 10, then reticulated at 15 psig (2.02 atmospheres) with a 3:1 by volume mixture of hydrogen and oxygen, as shown in FIG. 11. It was then fired under reducing conditions at 1000° C. in the same fashion as Example I. The final product bulk density was 0.053 gm/cc and had a maximum crushing strength of about 6 psi (0.42 kg/sq cm) and is shown in FIG. 12.

EXAMPLE VI

A foam was prepared using the Durez TM 14383 resin of Example III and toluene diisocyanate without a catalyst. Forty gms of the Durez TM resin was added to 20 gms of toluene diisocyanate. It took about 3 minutes for the two to be completely mixed and about 4 minutes for the mixture to start foaming. After about 10 minutes the foam had rigidified. It was brittle and it was difficult to reticulate. The foam was thermally treated at 1 atmosphere with a 3:1 by volume hydrogen to oxygen mixture, and was destroyed. Nitrogen was added as a diluent to the hydrogen and oxygen mixture to reduce its energy per unit volume. Another sample of foam was reticulated at 10 psig (1.7 atmospheres) with a mixture of 3 parts hydrogen, 1 part oxygen, and 4 parts nitrogen. This was found to be about the maximum energy level that could be used without destroying the sample. The 10 psig pressure of the combustible gas partially reticulated the foam. The sample was then carbonized under reducing conditions at 1000° C. in a retort. The final bulk density of the carbon product was 0.07 gm/cc and it had a maximum crushing strength of about 13 psi (0.91 kg/sq cm).

Polyurethane foams containing furan polymers, such as described by Sands in U.S. Pat. No. 3,574,540, are suitable as starting foams for this invention and can be thermally reticulated in the usual fashion and subsequently carbonized to a reticulate carbon structure. Care must be taken not to damage the foams during reticulation if they are only partially cured.

EXAMPLE VII

Using the procedure of U.S. Pat. No. 3,922,334 to Marek, an unreticulated polyester polyurethane foam having about 4 pores per cm and having a bulk density of 0.029 gms/cc was infused with a phenolic resin in tetrahydrofuran (THF). Excess impregnant solution was removed by squeezing from the surfaces of the foam. The sample was dried at a temperature of about 50° C. for 4 hours to volatilize and remove the THF. The sample was then reticulated with a combustible gas mixture. The sample was then carbonized in the fashion of Example I.

The process of the present invention rapidly produces the reticulate carbon structures, usually in less than about 5 hours. The carbon products are comparable in form to those shown in U.S. Pat. No. 3,927,186.

We claim:

1. The process for producing a reticulate carbon structure which comprises:
   (a) providing a thermoset or thermosettable resin containing polyisocyanate derived foam formed of interconnected cells with membranes dividing contiguous cells wherein the membranes are substantially thinner in cross-section than strands formed where the membranes intersect and wherein the cells are interconnected by openings in the membranes so as to allow a combustible gas to fill the cells and thus surround the membranes and which foam is carbonizable to a carbon structure;
   (b) introducing a combustible gas into the cells of the resin containing foam;
   (c) igniting the combustible gas to destroy the cell membranes and form a reticulate resin structure which is carbonizable; and
   (d) carbonizing the reticulate resin structure.

2. The process of claim 1 wherein the resin containing foam is prepared directly from at least two liquid resins which are foamed together wherein at least one is a polyisocyanate derived resin which is foamable and at least one is a thermosettable resin and wherein the resin containing foam is thermosettable before the combustible gas is ignited and is then thermoset after the membranes are destroyed.

3. The process of claim 1 wherein the resin containing foam is thermoset before the combustible gas is ignited to destroy the membranes.

4. The process of claim 1 wherein the resin containing foam is prepared directly by foaming an isocyanate derived resin with a thermosettable resin or resin precursor.

5. The process of claim 1 wherein the resin containing foam is prepared directly by foaming a polyurethane isocyanate derived resin and a thermosettable phenolic or furanic resin or resin precursor.

6. The process of claim 1 wherein the resin containing foam is provided by infusing a liquid thermosettable resin or resin precursor into an isocyanate derived foam and thereafter removing any excess unalloyed liquid resin from the infused foam.

7. The process of claim 6 wherein the isocyanate derived foam is a polyurethane and wherein the liquid thermosettable resin or resin precursor is a phenolic or furanic resin or resin precursor.

8. The process of claim 1 wherein the combustible gas is selected from a lower alkane or hydrogen mixed with oxygen or air.

9. The process of claim 1 wherein the foam is provided in a sealed chamber into which the combustible gas is introduced.

10. The process of claim 1 wherein the reticulate resin structure is carbonized under inert, reducing or vacuum conditions and at a temperature and for a time necessary to form a vitreous carbon reticulate structure.

11. The process for producing a reticulate carbon structure of interconnected strands which comprises:
    (a) providing a thermoset or thermosettable resin containing polyisocyanate derived foam formed of interconnected cells with membranes attached to the strands dividing contiguous cells wherein the membranes are substantially thinner in cross-section than strands formed where the membranes intersect and wherein the cells are interconnected by openings in the membranes so as to allow a gas to fill the cells and thus surround the membranes and which foam is carbonizable to a rigid carbon structure;
    (b) thermally destroying the membranes in the resin containing foam by igniting a combustible gas in the cells to form a reticulate resin structure which is carbonizable; and
    (c) carbonizing the reticulate resin structure.

12. The process of claim 11 wherein the resin reticulate structure is carbonized under inert, reducing or vacuum conditions to form the carbon reticulate structure.